July 26, 1949.  G. V. MALMENDIER  2,477,341
HEATER FOR EXTRUSION DIES
Filed Sept. 19, 1947
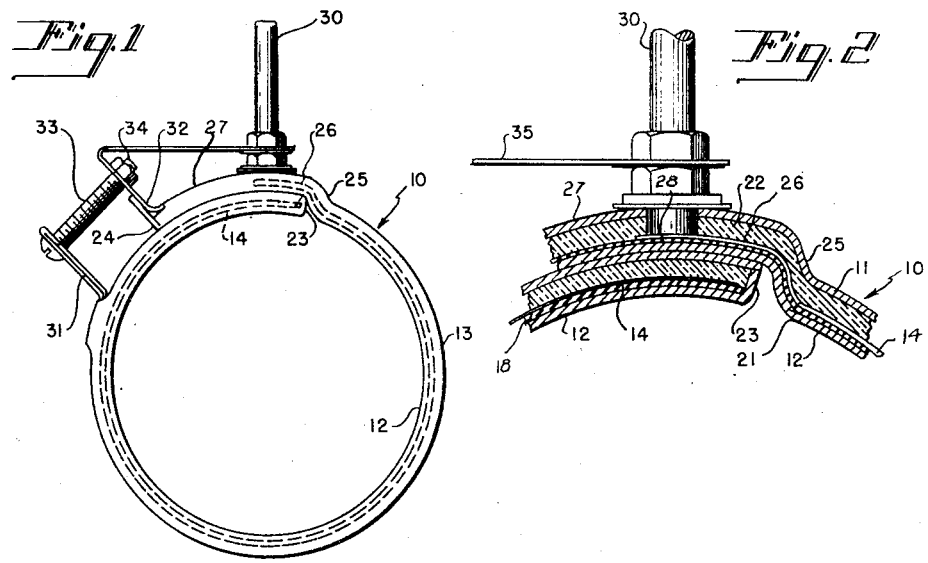
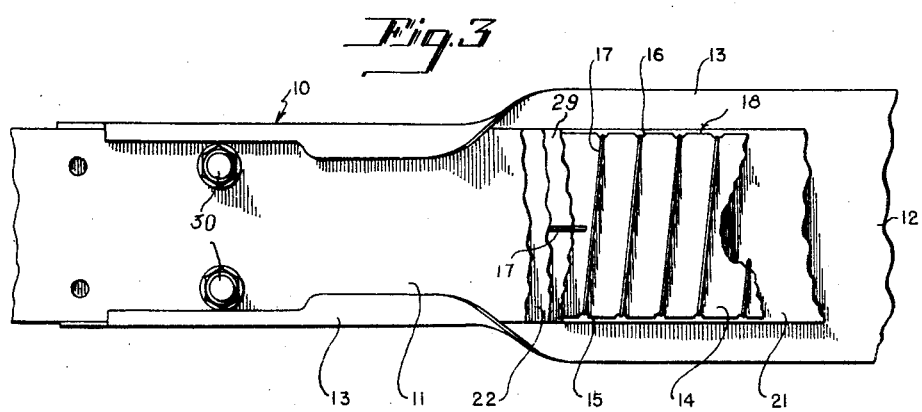
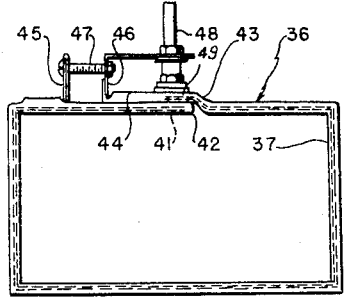
INVENTOR.
Gaspard V. Malmendier
BY
John P. Chandler
his ATTORNEY Patented July 26, 1949

2,477,341

UNITED STATES PATENT OFFICE 2,477,341

HEATER FOR EXTRUSION DIES

Gaspard V. Malmendier, Forest Hills, N. Y.

Application September 19, 1947, Serial No. 774,996

1 Claim. (Cl. 219—19)

This invention relates to an improved heating device for extrusion dies, and relates more particularly to a novel heating arrangement primarily for dies for extruding plastic materials which assures a uniform heat for all parts of the die.

When fluent plastic materials are extruded through a die for the formation of rods, strips, tubes, and the like, it is necessary to have the die heated to a predetermined temperature. The usual type of electric heater for this purpose surrounds the die and is suitably clamped thereto. The difficulty, however, is that the actual heating element does not extend completely around the die, the gap occurring where the securing element is disposed. The result is that the portion of the die adjacent the gap in the heating element is heated to a much lower degree than the remaining portion of the outer periphery of the die. The flow of the material is thus uneven, and the resulting extruded article is inferior.

An important object of the present invention is to provide a heating element which may be readily clamped to and removed from the die, and which heats all parts of the periphery of the die with uniformity.

In the drawings:

Fig. 1 is a side elevation of an electric heater embodying the present invention.

Fig. 2 is a broken section taken through the heater.

Fig. 3 is a broken plan view of the heater in generally flat condition.

Fig. 4 is a side elevation of a heater for use in connection with a die having a generally rectangular external contour.

The heater 10 shown in Figs. 1 and 2 is arranged for use on an extrusion die having a generally circular external periphery, and the heater 36 shown in Fig. 4 is shaped for use on a die of rectangular shape. Fig. 3 illustrates the internal construction of the heater of either shape. The circular heater may include an outer wall 11, and an inner wall 12 whose opposed marginal edges 13 are bent inwardly to provide a closed casing for the heating element 18. This element may comprise a core 14 of mica or other suitable heat-resistant, insulating material which is provided along opposed edges 15 with spaced notches 16 which receive the resistance wire 17 which is wrapped around the core. The wire is generally flat. A layer 21 of insulating material may be disposed between the heating element and the inner wall 12, and there may also be provided a layer 22 of asbestos or other suitable heat-insulating material between the heating element and the outer wall.

One terminal of the annular casing is indicated at 23, and adjacent the opposite or outer terminal 24 there is an outwardly-offset section 25, the remaining portion 27 of the casing overlaying the inner terminal portion. It will be noted from an examination of Figs. 1 and 2 that the heating element 14 extends up to the wall defining the inner terminal 23 of the casing. At its opposite end the heating element extends to a point designated as 26 which is adjacent this inner terminal. By virtue of this arrangement, there is clearly no gap between the opposed terminals of the heating element, and the heat is thus imparted uniformly to the entire outer periphery of the extrusion die (not shown). If desired, there may be a slight overlap of the terminals of the heating element. From the outer end 26 of the heating element the resistance wires, as shown at 28, extend to the usual electrical terminals 30.

Inasmuch as both electrical terminals 30 are at the outer end 27 of the casing, it is necessary to bring the wound resistance wire back to one of such terminals. One method of accomplishing this is illustrated in Fig. 3 wherein the return wire 17' is insulated from the wound portion by a strip 29 of mica or other insulating material interposed between the heating element proper and return wire 17'.

For the purpose of clamping the heater tightly on the die, the casing carries brackets 31 and 32 which are held together by means of screws 33 having nuts 34. Bracket 32 may have an extension 35 extending over to terminals 30.

The heater 36 shown in Fig. 4 is largely the same, except that the casing 37 is generally rectangular in shape. The heating element 41 extends from a point adjacent the inner terminal portion 42 entirely around the casing and beyond the offset portion 43 and into the outer terminal section 44 at least to a point 49 which is adjacent the inner terminal of the heating element. Brackets 45 and 46 and screws 47 hold the heater in place, and outer terminal section 48 carries the electrical terminals. In the arrangement of Fig. 4 the portions of such terminals engaged by the plug (not shown) are further from the heating element than is true of the arrangement of Figs. 1 and 2, and are therefore cooler. This arrangement may be embodied in the structure of Fig. 1.

It will be understood that the heater of Fig. 1 or Fig. 4 may be made in any size or shape and of any desired width.

While two forms or embodiments of the invention have been shown and described herein for illustrative purposes, and the construction and arrangement incidental to two specific applications thereof have been disclosed and discussed in detail, it is to be understood that the invention is limited neither to the mere details or relative arrangement of parts, nor to its specific embodiments shown herein, but that extensive deviations from the illustrated forms or embodiments of the invention may be made without departing from the principles thereof.

What I claim is:

An electric heater arranged to surround an extrusion die for plastic materials and having an internal contour shaped to closely fit the outer surface of such die, such heater including inner and outer walls which are joined together along their opposed marginal edges to form a closed casing, a heating element disposed therein and comprising a generally flat core having spaced notches along opposed longitudinal edges thereof, and a resistance wire wound around the core and being disposed within such notches, the outer terminal section of the casing having an outwardly offset portion and overlying the inner terminal section, the resistance wire extending from a wall defining the inner terminal of the casing to a point in the overlying outer terminal section adjacent the inner terminal of the wire so as to provide uniform heating entirely around the die with no gaps, electrical terminals extending from the outer terminal section, and means for clamping the heater to the die.

GASPARD V. MALMENDIER.

REFERENCES CITED

The following references are of record in the file of this patent:

UNITED STATES PATENTS

| Number | Name | Date |
|---|---|---|
| 1,236,440 | Humitsch | Aug. 14, 1917 |
| 1,692,164 | Fromm | Nov. 20, 1928 |
| 1,805,040 | Groves | May 12, 1931 |
| 2,308,636 | Wheeler | Jan. 19, 1943 |
| 2,423,488 | Dowe | July 8, 1947 |

FOREIGN PATENTS

| Number | Country | Date |
|---|---|---|
| 347,478 | Germany | Jan. 21, 1922 |
| 351,595 | Germany | Apr. 10, 1922 |
| 392,014 | Germany | Mar. 21, 1924 |